(12) United States Patent
Yuan et al.

(10) Patent No.: US 11,318,860 B2
(45) Date of Patent: May 3, 2022

(54) VEHICLE THERMAL MANAGEMENT SYSTEM, VEHICLE THERMAL MANAGEMENT METHOD AND VEHICLE

(71) Applicant: NIO (ANHUI) HOLDING CO., LTD., Hefei (CN)

(72) Inventors: Ye Yuan, Shanghai (CN); Feng Wang, Shanghai (CN); Yao Xiao, Shanghai (CN); Jieying Zhang, Shanghai (CN); Yanbo Wang, Shanghai (CN); Zhuanyao Gu, Shanghai (CN)

(73) Assignee: NIO (ANHUI) HOLDING CO., LTD., Hefei (CN)

( * ) Notice: Subject to any disclaimer, the term of this patent is extended or adjusted under 35 U.S.C. 154(b) by 433 days.

(21) Appl. No.: 16/519,886

(22) Filed: Jul. 23, 2019

(65) Prior Publication Data
US 2020/0031250 A1    Jan. 30, 2020

(30) Foreign Application Priority Data

Jul. 25, 2018   (CN) .......................... 201810825538.4

(51) Int. Cl.
*B60L 58/26*      (2019.01)
*H01M 10/625*   (2014.01)
(Continued)

(52) U.S. Cl.
CPC .............. *B60L 58/26* (2019.02); *B60L 58/27* (2019.02); *H01M 10/625* (2015.04);
(Continued)

(58) Field of Classification Search
CPC ...... B60L 58/26; B60L 58/27; H01M 10/625; H01M 10/633; H01M 10/663; H01M 10/617; H01M 10/63; H01M 10/613; H01M 10/615; H01M 10/66; H01M 2220/20; B60Y 2200/91; B60Y 2306/05; B60H 2001/00935; B60H 2001/00949; B60H 2001/326; B60H 2001/3263; B60H 2001/3272; B60H 2001/3277; B60H 2001/3282; B60H 2001/3285; B60H 2001/00307; B60H 1/00885; B60H 1/00907; B60H 1/00278; B60H 1/00392;
(Continued)

(56) References Cited

U.S. PATENT DOCUMENTS

2001/0040061 A1* 11/2001 Matuda ............... H01M 10/615
                                                                    180/68.2
2008/0196877 A1*  8/2008 Zeigler .................. F25B 13/00
                                                                    165/202
(Continued)

*Primary Examiner* — Emmanuel E Duke
(74) *Attorney, Agent, or Firm* — Sheridan Ross P.C.

(57) ABSTRACT

The application provides a vehicle thermal management system, a vehicle thermal management method and a vehicle. The system includes: a flow path switching valve; a compressor, an in-cabin thermal management flow path; an out-cabin thermal management flow path; and at least one battery module thermal management flow path. A flow path switching valve of the system is used for switching the on/off and flow direction of an intake port of the compressor, an exhaust port of the compressor, the in-cabin thermal management flow path, the out-cabin thermal management flow path, and the battery module thermal management flow path.

18 Claims, 7 Drawing Sheets

(51) Int. Cl.
  *H01M 10/633* (2014.01)
  *H01M 10/663* (2014.01)
  *B60L 58/27* (2019.01)

(52) U.S. Cl.
  CPC ....... *H01M 10/633* (2015.04); *H01M 10/663* (2015.04); *B60Y 2200/91* (2013.01); *B60Y 2306/05* (2013.01); *H01M 2220/20* (2013.01)

(58) Field of Classification Search
  CPC ....... B60H 1/00878; Y02E 60/10; B60K 1/00; B60K 2001/005
  See application file for complete search history.

(56) References Cited

U.S. PATENT DOCUMENTS

| | | | |
|---|---|---|---|
| 2009/0280395 A1* | 11/2009 | Nemesh | B60L 58/27 429/62 |
| 2010/0089547 A1* | 4/2010 | King | B60L 3/0053 165/42 |
| 2011/0113800 A1* | 5/2011 | Sekiya | B60L 1/003 62/151 |
| 2012/0174602 A1* | 7/2012 | Olivier | B60H 1/005 62/79 |
| 2012/0312040 A1* | 12/2012 | Choi | B60H 1/321 62/156 |
| 2013/0306302 A1* | 11/2013 | Osaka | B60H 1/00385 165/287 |
| 2014/0033761 A1* | 2/2014 | Kawakami | F25B 13/00 62/498 |
| 2015/0101789 A1* | 4/2015 | Enomoto | B60L 50/16 165/202 |
| 2015/0128632 A1* | 5/2015 | Kishita | B60H 1/32284 62/324.6 |
| 2016/0318499 A1* | 11/2016 | Yamanaka | B60H 1/32284 |
| 2016/0332505 A1* | 11/2016 | Yamanaka | B60H 1/00428 |
| 2017/0182864 A1* | 6/2017 | Heyl | B60H 1/00907 |

* cited by examiner

VEHICLE THERMAL MANAGEMENT SYSTEM, VEHICLE THERMAL MANAGEMENT METHOD AND VEHICLE

CROSS-REFERENCE TO RELATED APPLICATION

This application claims the benefit of China Patent Application No. 201810825538.4 filed Jul. 25, 2018, the entire disclosure of which is incorporated herein by reference.

TECHNICAL FIELD

The application relates to the field of vehicle thermal management, and more particularly, to a vehicle thermal management system and method for an electric vehicle.

BACKGROUND ART

As the development of vehicles becomes increasingly mature, in the current industry trends, the vehicles have begun to be optimized from multiple research and development directions in order to further improve performance, comfort or environmental friendliness. One of such research and development directions is for an electric vehicle.

For the electric vehicle, as one of core components and parts, a traction battery is the only power supply source for the electric vehicle, and the performance and service life thereof directly affect the overall performance of the electric vehicle. A battery power system with high-energy density can provide a high enough endurance mileage for the electric vehicle. Herein, the mentioned battery power system with high-energy density refers to a power system with a small volume and weight and able to provide high energy. At present, a commonly used ternary lithium battery has a high energy density but requires a strict range of operating temperature, and also its thermal runaway temperature is low, which requires an increasingly demanding thermal management system of a vehicle battery pack. In order to effectively control the operating temperature range of the traction battery during use and ensure the safety and service life of the whole power system, a lightweight battery power thermal management system with a more efficient heat exchange capability is desired.

The existing thermal management system for an internal combustion vehicle comprises a compressor, a power heat dissipation unit, an exchange unit, a cooling/heating air-conditioning unit and a vehicle control unit, and the above subunits complete setting control under the vehicle control unit. While in the electric vehicle, on the basis of the above units, additional components such as a heater, a heat exchanger and a controller are added, which increases the number and costs of vehicle components and also makes its control system become increasingly complex.

Therefore, how to provide an efficient and reliable vehicle thermal management system becomes an urgent technical problem.

SUMMARY OF THE INVENTION

An object of the application is to provide an efficient and reliable vehicle thermal management system.

Another object of the application is to provide an efficient and reliable vehicle thermal management method.

Yet another object of the application is to provide a vehicle using an efficient and reliable vehicle thermal management system.

In order to achieve the objects of the application, according to an aspect of the application, provided is a vehicle thermal management system, which comprises: a flow path switching valve; a compressor, an intake port and an exhaust port of the compressor being respectively connected to the flow path switching valve; an in-cabin thermal management flow path, which comprises fluid communication of an in-cabin heat exchanger, a first fan associated to the in-cabin heat exchanger, and a first throttle element connected to the in-cabin heat exchanger; a first end of the in-cabin thermal management flow path being connected to the flow path switching valve; an out-cabin thermal management flow path, which comprises an out-cabin heat exchanger, a second fan associated to the out-cabin heat exchanger, and a second throttle element connected to the out-cabin heat exchanger; a first end of the out-cabin thermal management flow path being connected to the flow path switching valve; and a second end of the out-cabin thermal management flow path being connected to a second end of the in-cabin thermal management flow path; and at least one battery module thermal management flow path, which comprises a cell heat exchanger associated to at least one cell of a battery module, and a third throttle element connected to the cell heat exchanger; a first end of the battery module thermal management flow path being connected to the flow path switching valve; and a second end of the battery module thermal management flow path being connected to the second end of the in-cabin thermal management flow path, the second end of the out-cabin thermal management flow path, and the flow path switching valve, respectively; wherein the flow path switching valve is used for switching the on/off and flow direction of the intake port of the compressor, the exhaust port of the compressor, the in-cabin thermal management flow path, the out-cabin thermal management flow path, and the battery module thermal management flow path.

Optionally, the in-cabin thermal management flow path is further provided with a first solenoid valve, which connects or disconnects the in-cabin thermal management flow path in a controlled way.

Optionally, the in-cabin thermal management flow path further comprises a second solenoid valve in series connection to the first throttle element, and a first check valve in parallel connection with the first throttle element and the second solenoid valve; and the first check valve is connected from the first end to the second end of the in-cabin thermal management flow path.

Optionally, the in-cabin thermal management flow path is further provided with a first temperature sensor and a second temperature sensor located at two ends of the in-cabin heat exchanger; and the vehicle thermal management system controls the opening degree of the first throttle element and/or the rotational speed of the first fan based on the first temperature sensor and/or the second temperature sensor.

Optionally, the out-cabin thermal management flow path further comprises a second check valve in series connection to the second throttle element, and a first unidirectional drier in parallel connection with the second throttle element and the second check valve; and the first unidirectional drier is connected from the first end to the second end of the out-cabin thermal management flow path, and the second check valve is connected from the second end to the first end of the out-cabin thermal management flow path.

Optionally, the out-cabin thermal management flow path further comprises: a third check valve and a second unidirectional drier which are arranged in parallel and close to the second end of the out-cabin thermal management flow path; and the third check valve is connected from the first end to the second end of the out-cabin thermal management flow path, and the second unidirectional drier is connected from the second end to the first end of the out-cabin thermal management flow path.

Optionally, further comprised is a bypass branch which connects a liquid outlet of the out-cabin heat exchanger and the intake port of the compressor; and a third solenoid valve is provided thereon, which connects or disconnects the bypass branch in a controlled way.

Optionally, the out-cabin thermal management flow path is further provided with a third temperature sensor and a fourth temperature sensor located at two ends of the out-cabin heat exchanger; and the vehicle thermal management system controls the opening degree of the second throttle element and/or the rotational speed of the second fan based on the third temperature sensor and/or the fourth temperature sensor.

Optionally, the battery module thermal management flow path is further provided with a fourth solenoid valve, which connects or disconnects the battery module thermal management flow path in a controlled way.

Optionally, the second end of the battery module thermal management flow path is provided with a first branch which is connected to the second end of the in-cabin thermal management flow path and the out-cabin thermal management flow path; and a second branch connected to the flow path switching valve; wherein the first branch further comprises a fourth check valve in series connection to the third throttle element, a fifth check valve in parallel connection with the third throttle element and the fourth check valve, and a fifth solenoid valve which connects or disconnects the first branch in a controlled way; and the second branch further comprises a sixth solenoid valve which connects or disconnects the second branch in a controlled way.

Optionally, the battery module thermal management flow path is further provided with a fifth temperature sensor and a sixth temperature sensor located at two ends of the cell heat exchanger; and the vehicle thermal management system controls the opening degree of the third throttle element based on the fifth temperature sensor and/or the sixth temperature sensor.

Optionally, further comprised is a heating element which is arranged close to the cell heat exchanger.

Optionally, the heating element is integrated with the cell heat exchanger.

Optionally, in a mounting state, the cell heat exchanger is arranged under a vehicle battery.

In order to achieve the objects of the application, according to a further aspect of the application, further provided is a vehicle thermal management method, which is used for the vehicle thermal management system as described above, the method comprising: a cell temperature equalization mode, in which the flow rate of the refrigerant flowing through each cell heat exchanger is adjusted by adjusting the opening degree of the third throttle element; and/or a cell cooling mode, in which the flow path switching valve is adjusted such that the refrigerant successively flows through the exhaust port of the compressor, the flow path switching valve, the out-cabin thermal management flow path, the battery module thermal management flow path, the flow path switching valve, and the intake port of the compressor; and/or a first cell heating mode, in which the flow path switching valve is adjusted such that the refrigerant successively flows through the exhaust port of the compressor, the flow path switching valve, the battery module thermal management flow path, the out-cabin thermal management flow path, the flow path switching valve, and the intake port of the compressor; and/or a second cell heating mode, in which the flow path switching valve is adjusted such that the refrigerant successively flows through the exhaust port of the compressor, the flow path switching valve, the battery module thermal management flow path, the flow path switching valve, and the intake port of the compressor.

Optionally, the cell temperature equalization mode comprises: controlling, on the basis of the degree of deviation between a cell temperature and a high-temperature preset threshold value, the operating frequency of the compressor and/or the opening degree of the third throttle element; and/or controlling, on the basis of the degree of deviation between the cell temperature and a low-temperature preset threshold value, the opening and closing of a heating element.

Optionally, the cell cooling mode comprises: starting or ending the cell cooling mode based on a cell temperature; and/or controlling, on the basis of the temperature sensor arranged downstream of the out-cabin heat exchanger, the rotational speed of the second fan; and/or controlling, on the basis of the temperature sensor arranged downstream of the cell heat exchanger, the opening degree of the third throttle element.

Optionally, the first cell heating mode comprises: starting or ending the first cell heating mode based on a cell temperature; and/or controlling, on the basis of the temperature sensor arranged downstream of the out-cabin heat exchanger, the rotational speed of the second fan and/or the opening degree of the second throttle element; and/or controlling, on the basis of the temperature sensor arranged downstream of the cell heat exchanger, the operating frequency of the compressor.

Optionally, the vehicle thermal management system further comprises a bypass branch which connects a liquid outlet of the out-cabin heat exchanger and the intake port of the compressor; and a third solenoid valve is provided thereon. The first cell heating mode comprises: controlling, on the basis of the temperature sensor arranged downstream of the out-cabin heat exchanger, the on/off of the third solenoid valve.

Optionally, the second cell heating mode comprises: ending the second cell heating mode based on the operating time of the second cell heating mode; and/or controlling, on the basis of the temperature sensor arranged downstream of the cell heat exchanger, the operating frequency of the compressor.

Optionally, the vehicle thermal management system further comprises a heating element arranged close to the cell heat exchanger, the method further comprising: a third cell heating mode, in which the heating element is switched on.

Optionally, the third cell heating mode comprises: ending the second cell heating mode based on a cell temperature; and/or controlling, on the basis of the cell temperature and the difference between the ambient temperature and the operating temperature of the vehicle thermal management system, the opening of the heating element.

Optionally: comparing a cell temperature with a high-temperature preset threshold value; when the cell temperature is greater than the high-temperature preset threshold value, entering the cell cooling mode, and when the cell temperature is not greater than the high-temperature preset threshold value, comparing the cell temperature with a low-temperature preset threshold value; entering the cell cooling mode; comparing the degree of deviation between the cell temperature and the high-temperature preset threshold value with a first preset deviation threshold value; when the degree of deviation between the cell temperature and the high-temperature preset threshold value is greater than the first preset deviation threshold value, entering the cell temperature equalization mode; when the degree of deviation between the cell temperature and the high-temperature preset threshold value is not greater than the first preset deviation threshold value, comparing a cell temperature with a high-temperature preset threshold value; comparing the cell temperature with a low-temperature preset threshold value; when the cell temperature is greater than the low-temperature preset threshold value, comparing the ambient temperature and a lower operating temperature limit of the vehicle thermal management system, and when the cell temperature is not greater than the low-temperature preset threshold value, comparing the degree of deviation between the cell temperature and the low-temperature preset threshold value with the second preset deviation threshold value; comparing the ambient temperature and a lower operating temperature limit of the vehicle thermal management system; when the ambient temperature is smaller than the lower operating temperature limit of the vehicle thermal management system, comparing the degree of deviation between the cell temperature and a low-temperature preset threshold value with a second preset deviation threshold value, and when the ambient temperature is not smaller than the lower operating temperature limit of the vehicle thermal management system, comparing the degree of deviation between the cell temperature and the low-temperature preset threshold value with the second preset deviation threshold value; comparing the degree of deviation between the cell temperature and a low-temperature preset threshold value with a second preset deviation threshold value; when the degree of deviation between the cell temperature and the low-temperature preset threshold value is greater than the second preset deviation threshold value, entering the third cell heating mode; when the degree of deviation between the cell temperature and the low-temperature preset threshold value is not greater than the second preset deviation threshold value, successively entering the cell temperature equalization mode, the second cell heating mode and the third cell heating mode; or successively entering the cell temperature equalization mode, the third cell heating mode and the first cell heating mode; comparing the degree of deviation between the cell temperature and the low-temperature preset threshold value with the second preset deviation threshold value; when the degree of deviation between the cell temperature and the low-temperature preset threshold value is greater than the second preset deviation threshold value, successively entering the cell temperature equalization mode and the first cell heating mode; or successively entering the cell temperature equalization mode and the first cell heating mode; comparing the degree of deviation between the cell temperature and the low-temperature preset threshold value with the second preset deviation threshold value; and when the degree of deviation between the cell temperature and the low-temperature preset threshold value is greater than the second preset deviation threshold value, entering the cell temperature equalization mode.

In order to achieve the objects of the application, according to yet a further aspect of the application, provided is a vehicle, which comprises the vehicle thermal management system as described above.

According to the vehicle thermal management system of the application, by applying a heat pump loop to both an in-cabin air conditioning system of the vehicle and the vehicle battery of same, especially a cooling system of the traction battery, a system with cost and control advantages is provided which is more efficient, reliable and lightweight.

DETAILED DESCRIPTION OF EMBODIMENTS

Figure 1:
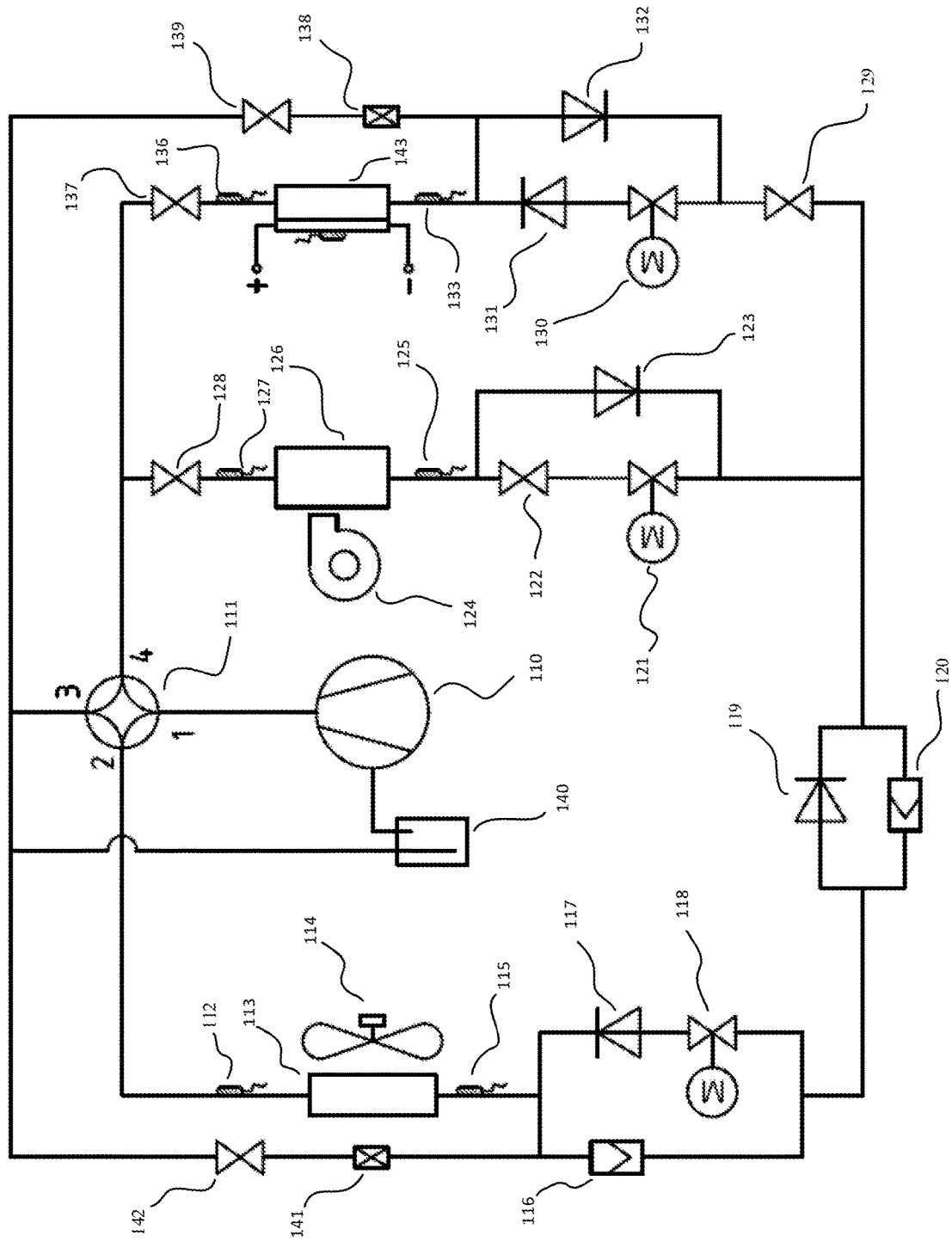
FIG. 1 is a schematic diagram of a vehicle thermal management system according to an embodiment of the application.

According to the concept of the application, an embodiment of a vehicle thermal management system is provided here in conjunction with the accompanying drawings. With reference to FIG. 1, it shows a vehicle thermal management system. The vehicle thermal management system comprises: a flow path switching valve 111; a compressor 110, an intake port and an exhaust port of the compressor 110 being respectively connected to the flow path switching valve 111; an in-cabin thermal management flow path, which comprises fluid communication of an in-cabin heat exchanger 126, a first fan 124 associated to the in-cabin heat exchanger 126, and a first throttle element 121 connected to the in-cabin heat exchanger 126; a first end of the in-cabin thermal management flow path being connected to the flow path switching valve 111; an out-cabin thermal management flow path, which comprises an out-cabin heat exchanger 113, a second fan 114 associated to the out-cabin heat exchanger 113, and a second throttle element 118 connected to the out-cabin heat exchanger 113; a first end of the out-cabin thermal management flow path being connected to the flow path switching valve 111; and a second end of the out-cabin thermal management flow path being connected to a second end of the in-cabin thermal management flow path; and at least one battery module thermal management flow path, which comprises a cell heat exchanger 143 associated to at least one cell of a battery module, and a third throttle element 130 connected to the cell heat exchanger 143; a first end of the battery module thermal management flow path being connected to the flow path switching valve 111; and a second end of the battery module thermal management flow path being connected to the second end of the in-cabin thermal management flow path, the second end of the out-cabin thermal management flow path, and the flow path switching valve 111, respectively; wherein the flow path switching valve 111 is used for switching the on/off and flow direction of the intake port of the compressor 110, the exhaust port of the compressor 110, the in-cabin thermal management flow path, the out-cabin thermal management flow path, and the battery module thermal management flow path. The throttle elements described therein each can use an electronic expansion valve, which can control the operating temperature of a vehicle battery by precisely adjusting the flow rate of a refrigerant. The compressor described therein can be a compressor of a medium or high back pressure type so as to provide sufficient power.

In this arrangement, thermal management of the vehicle battery inside a vehicle and air conditioning of an in-cabin environment share the refrigerant, which on the one hand reduces an intermediate heat transfer process so as to improve an energy usage efficiency, and on the other hand, by means of integrating a battery thermal management system into a vehicle thermal management system, saves on intermediate process elements such as a water pump and a heat exchanger, thus optimizing the system and reducing the costs; and this kind of phase change refrigerant can avoid the risk of losing control of the battery caused by leakage of a cooling fluid in a traditional liquid cooling system, and improves the safety performance and service life of a battery pack. Additionally, reducing the number of components and parts and thus improving the system integration makes the system more lightweight; the system can specifically heat or cool each cell in the battery module and has a higher control precision; and a heat pump loop also provides a higher energy efficiency and reliability, and provides increased support for vehicle endurance capability.

In addition, as the flow path switching valve 120 exists and can switch and change directions of the intake port of the compressor 110, the exhaust port of the compressor 110, and flow paths between the in-cabin heat exchanger 126, the out-cabin heat exchanger 113 and the cell heat exchanger 143, different operating modes of the heat pump loop will be described in detail in the following vehicle thermal management method.

Various flow paths in the vehicle thermal management system will be described in detail below in conjunction with FIG. 1.

Firstly, the in-cabin thermal management flow path is further provided with a first solenoid valve 128. At this time, when the flow path is required to be communicated to perform refrigeration or heating for the in-cabin heat exchanger 126, the first solenoid valve 128 will be controlled to remain in an on state; and when the flow path is no longer required, the first solenoid valve 128 will be controlled to remain in an off state. Specifically, the solenoid valve described as above and as follows can be selected as a model which is connected when power on and is disconnected when power off, and can also be selected as a model which is disconnected when power on and is connected when power off, which will not be described in further detail.

In addition, the in-cabin thermal management flow path further comprises a second solenoid valve 122 in series connection to the first throttle element 121, and a first check valve 123 in parallel connection with the first throttle element 121 and the second solenoid valve 122; and the first check valve 123 is connected from the first end to the second end of the in-cabin thermal management flow path. At this time, when flowing from the first end to the second end of the in-cabin thermal management flow path, the refrigerant successively passes through the first solenoid valve 128, the in-cabin heat exchanger 126 and the first check valve 123; and when flowing from the second end to the first end of the in-cabin thermal management flow path, the refrigerant successively passes through the first throttle element 121, the second solenoid valve 122, the in-cabin heat exchanger 126 and the first solenoid valve 128.

Moreover, the in-cabin thermal management flow path is further provided with a first temperature sensor 127 and a second temperature sensor 125 located at two ends of the in-cabin heat exchanger 126; and these temperature sensors are mainly used for providing parameters for system control, and the vehicle thermal management system will control the opening degree of the first throttle element 121 and/or the rotational speed of the first fan 124 based on the first temperature sensor 127 and/or the second temperature sensor 125.

In a second aspect, the out-cabin thermal management flow path further comprises a second check valve 117 in series connection to the second throttle element 118, and a first unidirectional drier 116 in parallel connection with the second throttle element 118 and the second check valve 117; and the first unidirectional drier 116 is connected from the first end to the second end of the out-cabin thermal management flow path, and the second check valve 117 is connected from the second end to the first end of the out-cabin thermal management flow path. At this time, when flowing from the first end to the second end of the out-cabin thermal management flow path, the refrigerant successively passes through the out-cabin heat exchanger 113 and the first unidirectional drier 116; and when flowing from the second end to the first end of the out-cabin thermal management flow path, the refrigerant successively passes through the second throttle element 118, the second check valve 117 and the out-cabin heat exchanger 113.

On this basis, the out-cabin thermal management flow path further comprises: a third check valve 119 and a second unidirectional drier 120 which are arranged in parallel and close to the second end of the out-cabin thermal management flow path; and the third check valve 119 is connected from the first end to the second end of the out-cabin thermal management flow path, and the second unidirectional drier 120 is connected from the second end to the first end of the out-cabin thermal management flow path. At this time, when flowing from the first end to the second end of the out-cabin thermal management flow path, the refrigerant successively passes through the out-cabin heat exchanger 113, the first unidirectional drier 116 and the third check valve 119; and when flowing from the second end to the first end of the out-cabin thermal management flow path, the refrigerant successively passes through the second unidirectional drier, the second throttle element 118, the second check valve 117 and the out-cabin heat exchanger 113.

In addition, the out-cabin thermal management flow path further comprises a bypass branch which connects a liquid outlet of the out-cabin heat exchanger 113 and the intake port of the compressor 110; and a third solenoid valve 142 is provided thereon, and the third solenoid valve 142 connects or disconnects the bypass branch in a controlled way. For example, if a too low temperature appears to the out-cabin heat exchanger 113 in a heating mode and causes a frosting phenomenon, the bypass branch can be connected such that a high-temperature and high-pressure gas phase refrigerant discharged via the compressor 110 directly flows into the out-cabin heat exchanger 113 for heat release and defrosting to remove the frosting phenomenon.

Moreover, the out-cabin thermal management flow path is further provided with a third temperature sensor 112 and a fourth temperature sensor 115 located at two ends of the out-cabin heat exchanger 113. These temperature sensors are mainly used for providing parameters for system control, and the vehicle thermal management system controls the opening degree of the second throttle element 118 and/or the rotational speed of the second fan 114 based on the third temperature sensor 112 and/or the fourth temperature sensor 115.

In a third aspect, the battery module thermal management flow path is further provided with a fourth solenoid valve 137, and at this time, when the flow path is required to be communicated to perform refrigeration or heating for the cell heat exchanger 143, the fourth solenoid valve 137 will be controlled to remain in an on state; and when the flow path is no longer required, the fourth solenoid valve 137 will be controlled to remain in an off state.

Optionally, a first branch, which is connected to the second end of the in-cabin thermal management flow path and the out-cabin thermal management flow path, and a second branch, which is connected to the flow path switching valve 111, are provided at the second end of the battery module thermal management flow path.

The first branch further comprises a fourth check valve 131 in series connection to the third throttle element 130, a fifth check valve 132 in parallel connection with the third throttle element 130 and the fourth check valve 131, and a fifth solenoid valve 129 which connects or disconnects the first branch in a controlled way. At this time, when flowing from the first end of the battery module thermal management flow path to a second end of the first branch, the refrigerant successively passes through the fourth solenoid valve 137, the cell heat exchanger 143, the fifth check valve 132 and the fifth solenoid valve 129; and when flowing from the second end of the first branch to the first end of the in-cabin thermal management flow path, the refrigerant successively passes through the fifth solenoid valve 129, the third throttle element 130, the fourth check valve 131, the cell heat exchanger 143 and the fourth solenoid valve 137.

The second branch further comprises a sixth solenoid valve 139 which connects or disconnects the second branch in a controlled way. For example, if a vehicle application scene in an extreme cold condition causes the ambient temperature to be too low, the second branch 300 can be connected such that the high-temperature and high-pressure gas phase refrigerant discharged via the compressor 110 directly flows into a second heat exchanger 300 for heat release and heating the vehicle battery or the in-cabin environment, so as to meet start-up or operation requirements of the vehicle battery as well as the usage requirements of a user in the cabin. At this time, when flowing from the first end of the battery module thermal management flow path to a second end of the second branch, the refrigerant successively passes through the fourth solenoid valve 137, the cell heat exchanger 143, a filter 138 and the sixth solenoid valve 139; and when flowing from the second end of the second branch to the first end of the in-cabin thermal management flow path, the refrigerant successively passes through the sixth solenoid valve 139, the filter 138, the cell heat exchanger 143 and the fourth solenoid valve 137.

Optionally, the battery module thermal management flow path is further provided with a fifth temperature sensor 136 and a sixth temperature sensor 133 located at two ends of the cell heat exchanger 143. These temperature sensors are mainly used for providing parameters for system control, and the vehicle thermal management system controls the opening degree of the third throttle element 130 based on the fifth temperature sensor 136 and/or the sixth temperature sensor 133.

In addition, to further improve the heating or cooling effect of the heat pump loop 100 on the vehicle battery, in a mounting state, the cell heat exchanger 143 can also be arranged under the vehicle battery.

Also optionally, a gas-liquid separator 140 can also be provided in front of the intake port of the compressor 110 to achieve gas-liquid separation to avoid surge caused by a liquid refrigerant entering the compressor.

To avoid the problem that in some special cases, such as in an extreme cold environment, heating capacity provided by the heat pump loop still cannot meet the requirements of heating a vehicle traction battery, the system thus may also comprise a heating element, which is arranged close to the cell heat exchanger 143. Optionally, the heating element is integrated with the cell heat exchanger 143. Herein, the heating element 400 can provide a heating effect by active control. For example, it can be a controlled PTC heater. In practical applications, due to the influence of the external temperature and the battery pack thermal management system, a deviation of the temperature of the battery will appear during the operation of the electric vehicle. At this time, the system may include a plurality of controlled PTC heaters respectively for heating different areas of the vehicle traction battery. In this arrangement, spot heating can be performed in a more energy-saving and efficient way to a deviated module in the vehicle traction battery, which can avoid an excessive temperature difference deviation between battery packs during the operation of the vehicle and ensure the overall consistency and service life of cells of the battery packs. More specifically, considering the limitation of the structural space in the vehicle, the heating element 400 can also be integrated with the second heat exchanger 140, so as to improve the integration of the thermal management system in the vehicle.

In addition, according to a further aspect of the application, a vehicle thermal management method is provided herein which is used in combination with the vehicle thermal management system described in any of the foregoing embodiments or a combination thereof to achieve a better effect; and the method can also be used in combination with other types of vehicle thermal management systems, as long as the vehicle thermal management system has a hardware and a connection method to achieve the corresponding mode.

Figure 2:
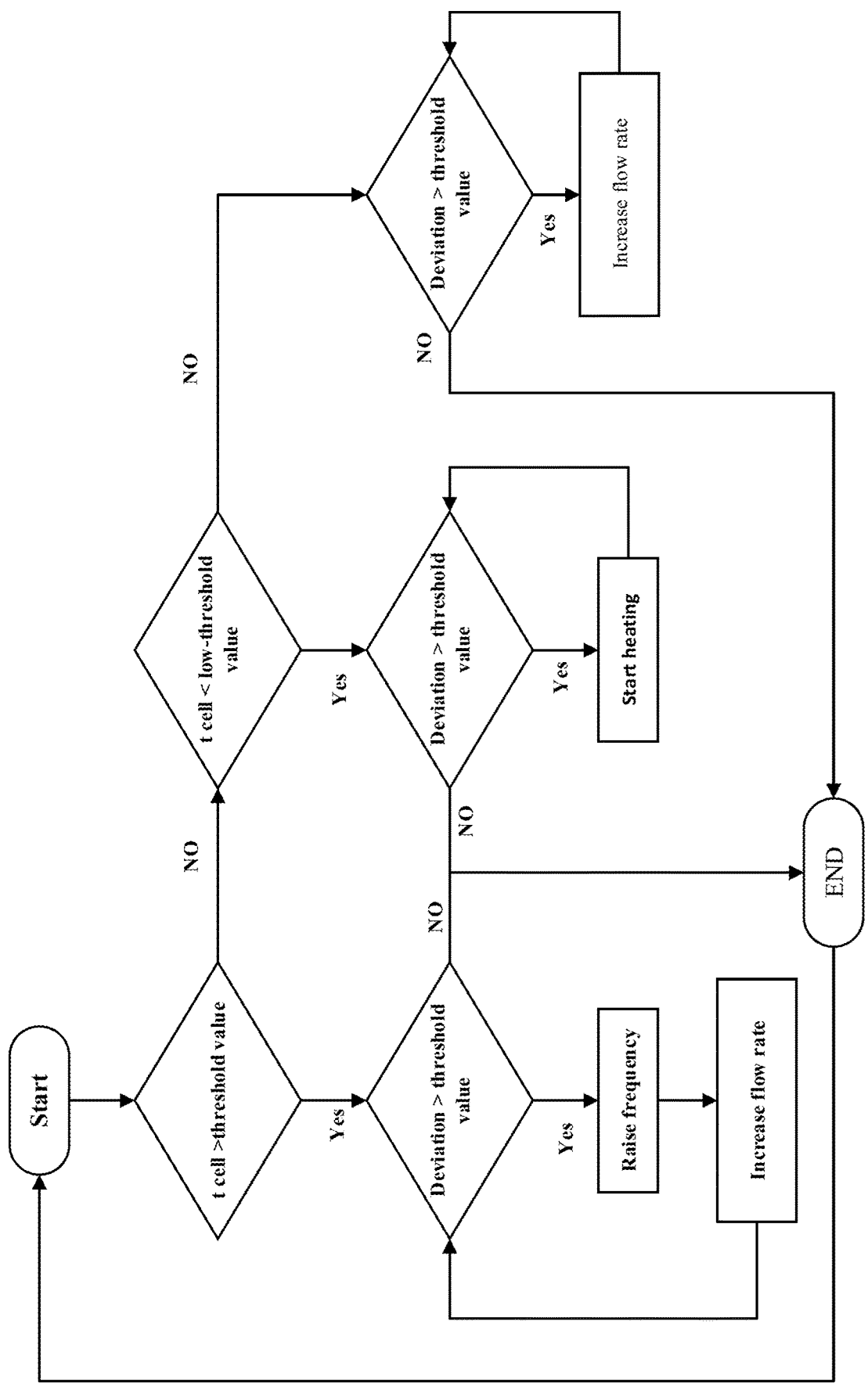
FIG. 2 is a control flow chart of a vehicle thermal management method according to an embodiment of the application in a cell temperature equalization mode.

With reference to FIG. 2, the method comprises a cell temperature equalization mode, in which the flow rate of the refrigerant flowing through each cell heat exchanger 143 is adjusted mainly by adjusting the opening degree of the third throttle element 130. Specifically, the cell temperature equalization mode comprises: controlling, on the basis of the degree of deviation between a cell temperature and a high-temperature preset threshold value, the operating frequency of the compressor 110 and/or the opening degree of the third throttle element 130; and/or controlling, on the basis of the degree of deviation between the cell temperature and a low-temperature preset threshold value, the opening and closing of a heating element. Cell temperature equalization includes heating equalization and cooling equalization, and in an early stage of the mode, the degree of deviation between the cell temperature and each of the high-temperature preset threshold value and the low-temperature preset threshold value is judged to determine whether to enter a cooling equalization mode or a heating equalization mode. For example, when the cell temperature is above the high-temperature preset threshold value, and a cell temperature deviation is greater than a first preset threshold value, the system will control the compressor to raise the frequency and controls the third throttle element to increase the opening degree to improve the flow rate of the refrigerant flowing through an overheated cell branch. In a further example, when the cell temperature is below the low-temperature preset threshold value, and the cell temperature deviation is greater than a second preset threshold value, the system will control the opening of the heating element to improve the low temperature condition of the cell. In yet a further example, when the cell temperature is not above the high-temperature preset threshold value and also not below the low-temperature preset threshold value, and the cell temperature deviation is greater than the second preset threshold value, the system will control the third throttle element to increase the opening degree to improve the flow rate of the refrigerant flowing through the overheated cell branch.

Figure 3:
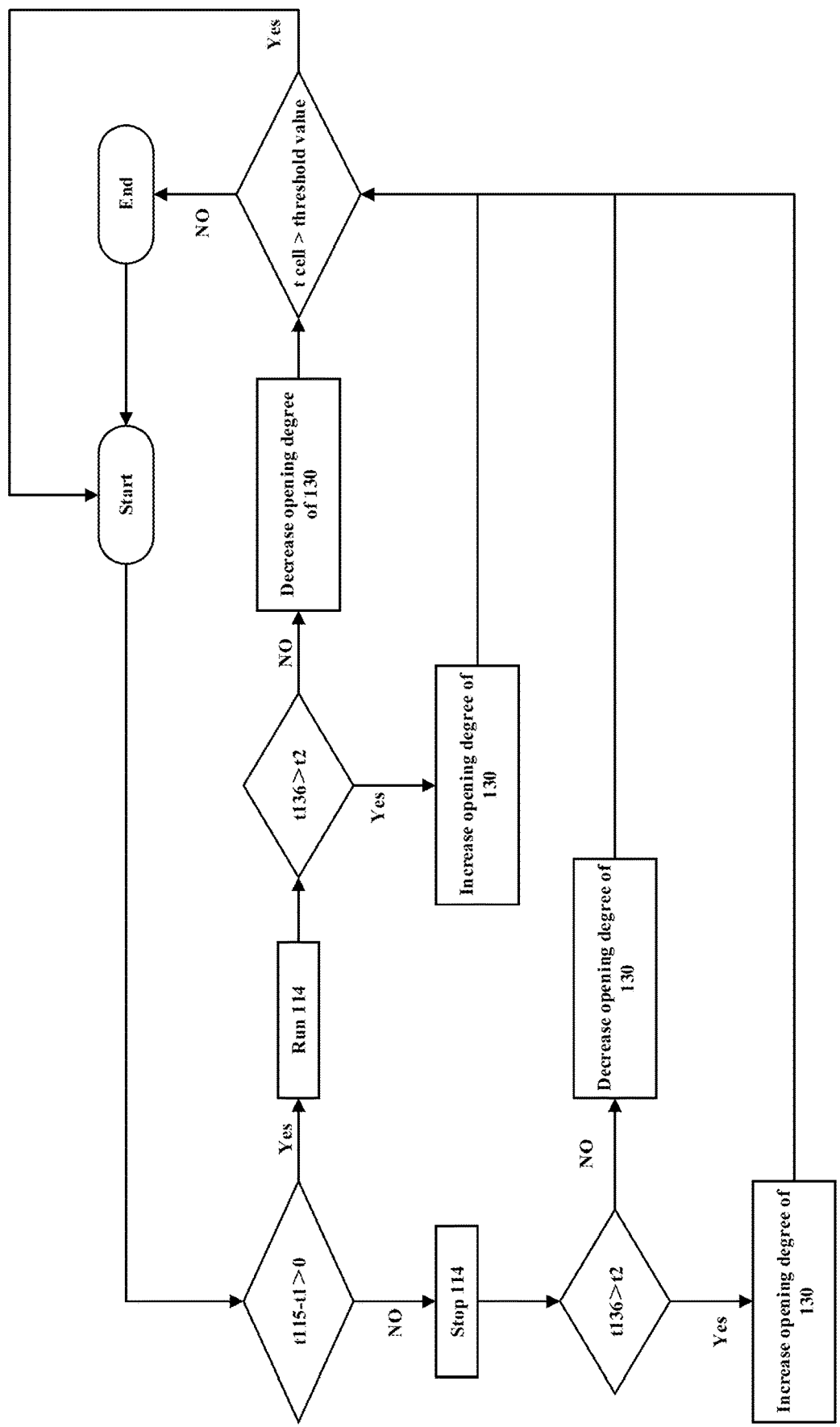
FIG. 3 is a control flow chart of the vehicle thermal management method according to an embodiment of the application in a cell cooling mode.

With reference to FIG. 3, the method further comprises a cell cooling mode, in which the flow path switching valve 111 is mainly adjusted such that the refrigerant successively flows through the exhaust port of the compressor 110, the flow path switching valve 111, the out-cabin thermal management flow path, the battery module thermal management flow path, the flow path switching valve 111, and the intake port of the compressor 110. Specifically, the cell cooling mode comprises: starting or ending the cell cooling mode based on the cell temperature; and/or controlling, on the basis of the temperature sensor arranged downstream of the out-cabin heat exchanger 113, the rotational speed of the second fan 114; and/or controlling, on the basis of the temperature sensor arranged downstream of the cell heat exchanger 143, the opening degree of the third throttle element 130. After the compressor 110 is started, the fourth solenoid valve 137 and the fifth solenoid valve 129 are controlled such that same are opened, and the first solenoid valve 128, the second solenoid valve 122, the third solenoid valve 142 and the sixth solenoid valve 139 are controlled such that same are closed. The compressor 110 compresses the refrigerant into a high-temperature and high-pressure gas state, and then the refrigerant enters the flow path switching valve 111 (port 1 to port 2) and passes through the out-cabin heat exchanger 113. The fourth temperature sensor 115 senses the temperature, compares same with a set threshold value ti, and determines whether the second fan 114 is running, and then a high-temperature and high-pressure liquid refrigerant passes through the first unidirectional drier 116, the third check valve 119, and the fifth solenoid valve 129. The flow path can be further additionally provided with a subcooler behind the first unidirectional drier 116 and the second throttle element 118 and in front of the third check valve 119 and the second unidirectional drier 120 to improve the system efficiency. Then the refrigerant flows into the third throttle element 130, the opening degree of the third throttle element 130 is controlled by the fifth temperature sensor 136 arranged behind the cell heat exchanger 143, and then the flow rate of the refrigerant passing through the cell heat exchanger 143 is controlled to provide a suitable cooling effect for the battery module or the cell. After that, the refrigerant flows through the flow path switching valve 111 (port 4 to port 3) and returns to the compressor 110 after separation in the gas-liquid separator 140.

Figure 4:
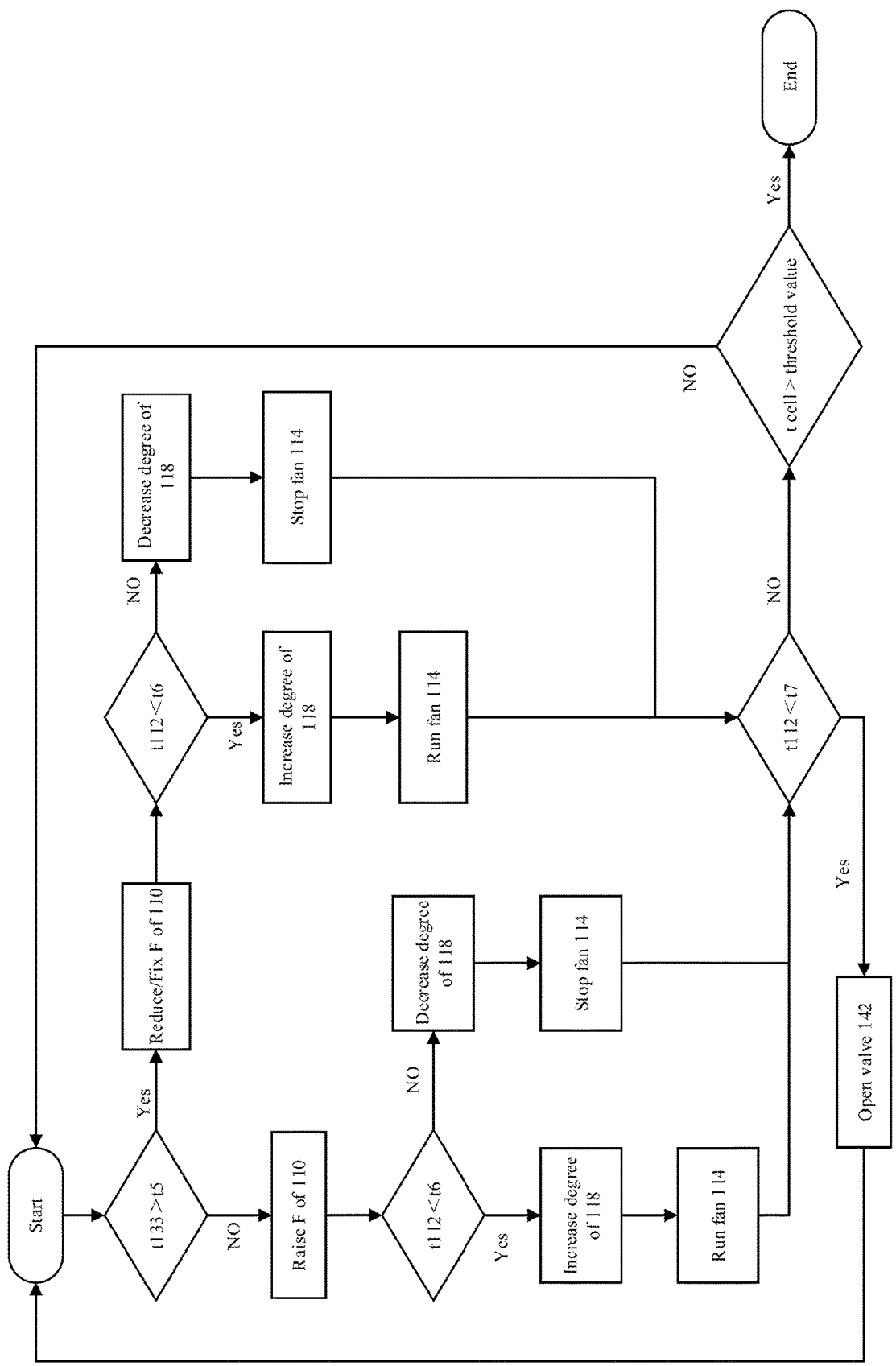
FIG. 4 is a control flow chart of the vehicle thermal management method according to an embodiment of the application in a first cell heating equalization mode.

With reference to FIG. 4, the method further comprises a first cell heating mode, in which the flow path switching valve 111 is mainly adjusted such that the refrigerant successively flows through the exhaust port of the compressor 110, the flow path switching valve 111, the battery module thermal management flow path, the out-cabin thermal management flow path, the flow path switching valve 111, and the intake port of the compressor 110. Specifically, the first cell heating mode comprises: starting or ending the first cell heating mode based on the cell temperature; and/or controlling, on the basis of the temperature sensor arranged downstream of the out-cabin heat exchanger 113, the rotational speed of the second fan 114 and/or the opening degree of the second throttle element 118; and/or controlling, on the basis of the temperature sensor arranged downstream of the cell heat exchanger 143, the operating frequency of the compressor 110. After the compressor 110 is started, the fourth solenoid valve 137 and the fifth solenoid valve 129 are controlled such that same are opened, and the first solenoid valve 128, the second solenoid valve 122, the third solenoid valve 142 and the sixth solenoid valve 139 are controlled such that same are closed. The compressor 110 compresses the refrigerant into a high-temperature and high-pressure gas state, and then the refrigerant enters the flow path switching valve 111 (port 1 to port 4) and passes through the cell heat exchanger 143, thus heating the battery module or the cell. The sixth temperature sensor 133 senses the temperature, compares same with a set threshold value t5, and determines whether the operating frequency of the compressor 110 needs to be adjusted, and then a high-temperature and high-pressure liquid refrigerant passes through the fifth check valve 132, the fifth solenoid valve 129, and the second unidirectional drier 120. The flow path can be further additionally provided with a subcooler behind the first unidirectional drier 116 and the second throttle element 118 and in front of the third check valve 119 and the second unidirectional drier 120 to improve the system efficiency. Then the refrigerant flows into the second throttle element 118 and the second check valve 117, and the refrigerant exchanges heat with the external environment through the out-cabin heat exchanger 113. The opening degree of the second throttle element 118 and the rotational speed of the second fan 114 are controlled by the third temperature sensor 112 arranged behind the out-cabin heat exchanger 113, and then the flow rate of the refrigerant passing through the cell heat exchanger 143 is controlled to provide a suitable heating effect for the battery module or the cell. After that, the refrigerant flows through the flow path switching valve 111 (port 2 to port 3) and returns to the compressor 110 after separation in the gas-liquid separator 140.

Optionally, if the vehicle thermal management system is provided with the bypass branch, which connects the liquid outlet of the out-cabin heat exchanger 113 and the intake port of the compressor 110 and on which the third solenoid valve 142 is provided, the first cell heating mode further comprises: controlling, on the basis of the temperature sensor arranged downstream of the out-cabin heat exchanger 113, the on/off of the third solenoid valve 142. At this time, when the third temperature sensor 112 senses that the temperature is too low, the flow path switching valve 111 switches to connect from port 1 to port 2, and the third solenoid valve 142 is opened, so that a high-temperature and high-pressure refrigerant directly enters the out-cabin heat exchanger 113 for defrosting and then returns to the compressor 110 via the flow path switching valve 111 (port 4 to port 3).

Figure 5:
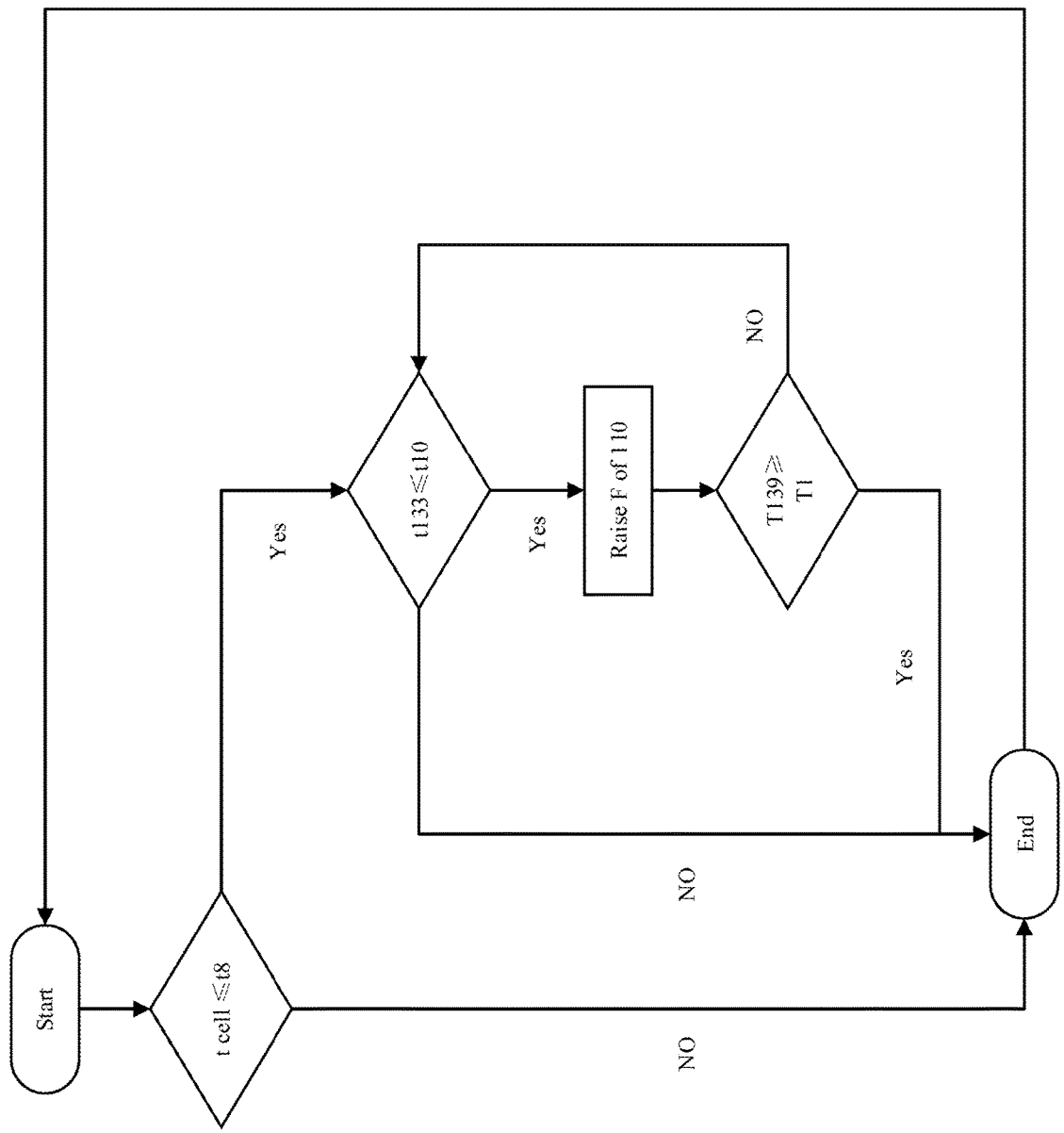
FIG. 5 is a control flow chart of the vehicle thermal management method according to an embodiment of the application in a second cell heating equalization mode.

With reference to FIG. 5, the method further comprises a second cell heating mode, in which the flow path switching valve 111 is adjusted such that the refrigerant successively flows through the exhaust port of the compressor 110, the flow path switching valve 111, the battery module thermal management flow path, the flow path switching valve 111, and the intake port of the compressor 110. Specifically, the second cell heating mode comprises: ending the second cell heating mode based on the operating time of the second cell heating mode; and/or controlling, on the basis of the temperature sensor arranged downstream of the cell heat exchanger 143, the operating frequency of the compressor 110. After the compressor 110 is started, the fourth solenoid valve 137 and the sixth solenoid valve 139 are controlled such that same are opened, and the first solenoid valve 128, the second solenoid valve 122, the third solenoid valve 142 and the fifth solenoid valve 129 are controlled such that same are closed. The compressor 110 compresses the refrigerant into a high-temperature and high-pressure gas state, and then the refrigerant enters the flow path switching valve 111 (port 1 to port 4) and passes through the cell heat exchanger 143, thus heating the battery module or the cell. The sixth temperature sensor 133 senses the temperature, compares same with a set threshold value t10, and determines whether the operating frequency of the compressor 110 needs to be adjusted, and then a high-temperature and high-pressure liquid refrigerant flows into the gas-liquid separator 140 and returns to the compressor 110 after separation therein. In addition, the connection time of the sixth solenoid valve 139 should be compared with the set operating time of the mode, and the second cell heating mode is ended upon reaching the set value.

Figure 6:
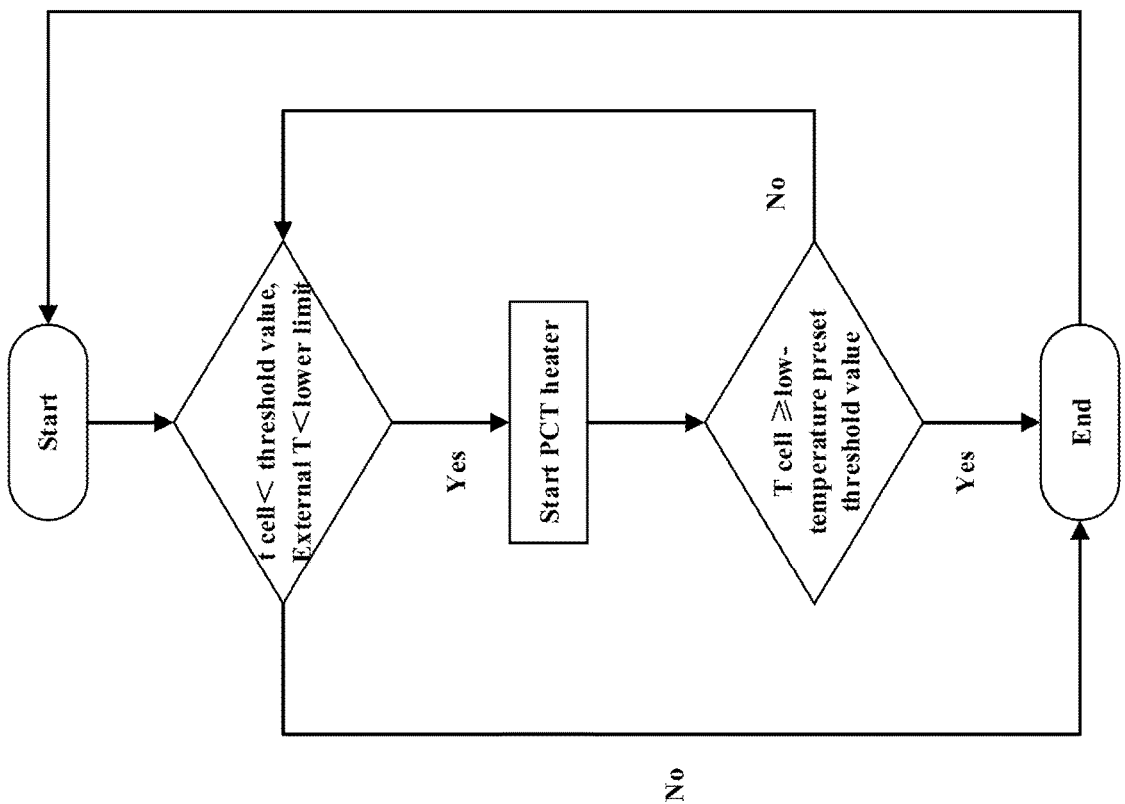
FIG. 6 is a control flow chart of the vehicle thermal management method according to an embodiment of the application in a third cell heating equalization mode.

With reference to FIG. 6, if the vehicle thermal management system is provided with a heating element arranged close to the cell heat exchanger 143, the method further comprises a third cell heating mode, in which the heating element is switched on. Specifically, the third cell heating mode comprises: ending the second cell heating mode based on the cell temperature; and/or controlling, on the basis of the cell temperature and the difference between the ambient temperature and the operating temperature of the vehicle thermal management system, the opening of the heating element. By comparing the cell temperature with the low-temperature preset threshold value and comparing the ambient temperature with the operating temperature of the vehicle thermal management system, it is determined whether the heating element needs to be switched on. When the cell temperature is below the low-temperature preset threshold value and the ambient temperature is below a lower operating temperature limit of the vehicle thermal management system, the heating element is switched on; and when the cell temperature increases above the preset threshold value, the heating element is switched off.

Figure 7:
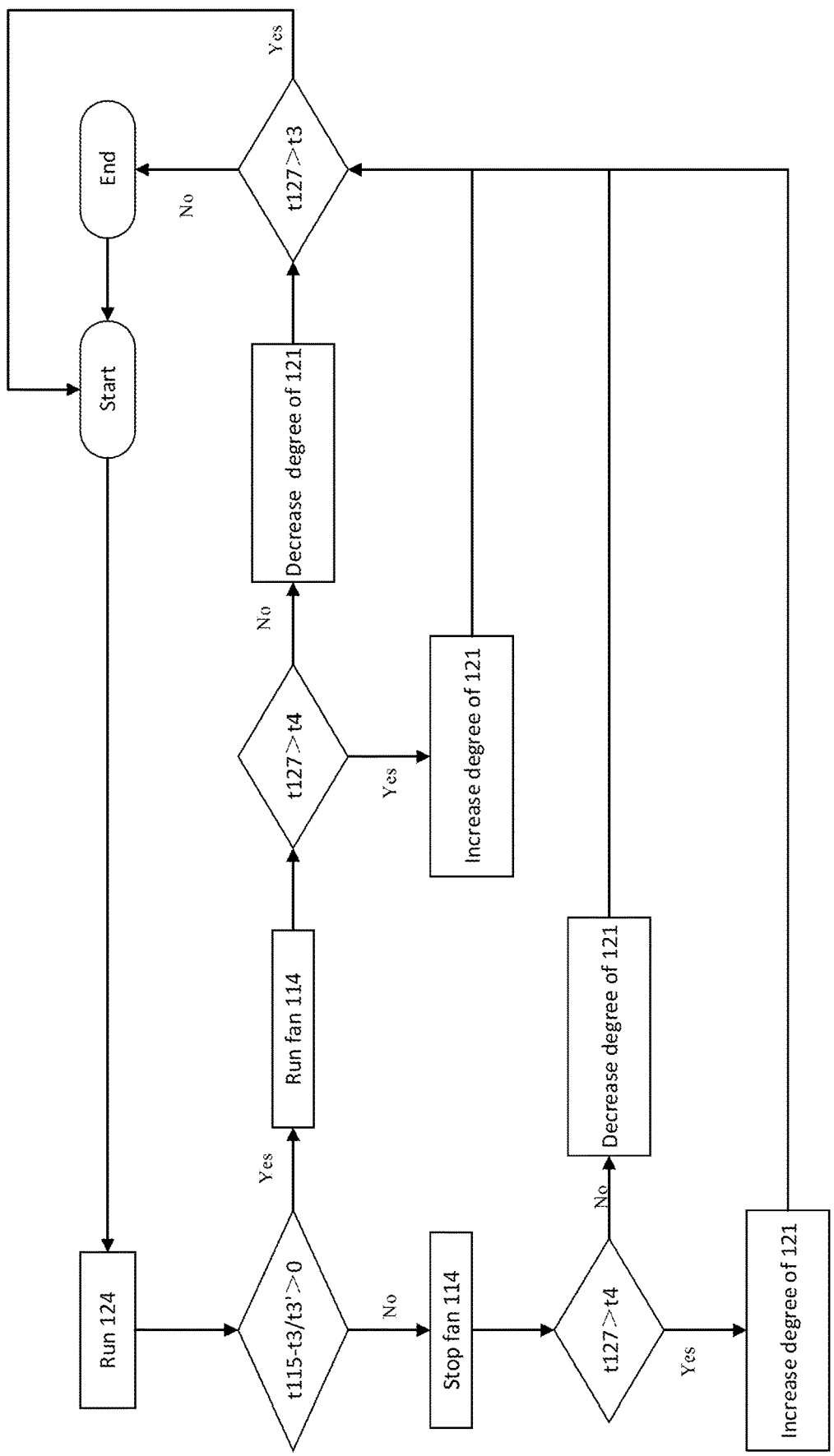
FIG. 7 is a control flow chart of the vehicle thermal management method according to an embodiment of the application in a refrigeration mode.

Optionally, with reference to FIG. 7, as a conventional air conditioning function of the vehicle, the method further comprises a conventional vehicle air-conditioning refrigeration mode. After the compressor 110 is started, the first solenoid valve 128 and the second solenoid valve 122 are controlled such that same are opened, and the third solenoid valve 142, the fourth solenoid valve 137, the fifth solenoid valve 129 and the sixth solenoid valve 139 are controlled such that same are closed. The compressor 110 compresses the refrigerant into a high-temperature and high-pressure gas state, and then the refrigerant enters the flow path switching valve 111 (port 1 to port 2) and passes through the out-cabin heat exchanger 113. The fourth temperature sensor 115 senses the temperature, compares same with a set threshold value ti, and determines whether the second fan 114 is running, and then a high-temperature and high-pressure liquid refrigerant passes through the first unidirectional drier 116, the third check valve 119, and the fifth solenoid valve 129. The flow path can be further additionally provided with a subcooler behind the first unidirectional drier 116 and the second throttle element 118 and in front of the third check valve 119 and the second unidirectional drier 120 to improve the system efficiency. Then the refrigerant flows into the first throttle element 121, the opening degree of the first throttle element 121 and the rotational speed of the first fan 124 are controlled by the first temperature sensor 127 arranged behind the in-cabin heat exchanger 126, and then the flow rate of the refrigerant passing through the in-cabin heat exchanger 126 is controlled to provide a suitable cooling effect for a cabin space. After that, the refrigerant flows through the first solenoid valve 128 and the flow path switching valve 111 (port 4 to port 3) again and returns to the compressor 110 after separation in the gas-liquid separator 140.

It should be noted that where there is no conflict in the execution of the foregoing modes, both the air conditioning function and the heating/cooling function of the battery module can be used, for example, the air-conditioning refrigeration mode and the first cell heating mode; and the air-conditioning refrigeration mode and the third cell heating mode, etc.

An application embodiment of one of the foregoing modes is also provided below, and shows application scenarios of different methods in different situations. In this embodiment, the method comprises: comparing a cell temperature with a high-temperature preset threshold value; when the cell temperature is greater than the high-temperature preset threshold value, entering the cell cooling mode, and when the cell temperature is not greater than the high-temperature preset threshold value, comparing the cell temperature with a low-temperature preset threshold value; entering the cell cooling mode; comparing the degree of deviation between the cell temperature and the high-temperature preset threshold value with a first preset deviation threshold value; when the degree of deviation between the cell temperature and the high-temperature preset threshold value is greater than the first preset deviation threshold value, entering the cell temperature equalization mode; when the degree of deviation between the cell temperature and the high-temperature preset threshold value is not greater than the first preset deviation threshold value, comparing a cell temperature with a high-temperature preset threshold value; comparing the cell temperature with a low-temperature preset threshold value; when the cell temperature is greater than the low-temperature preset threshold value, comparing the ambient temperature and a lower operating temperature limit of the vehicle thermal management system, and when the cell temperature is not greater than the low-temperature preset threshold value, comparing the degree of deviation between the cell temperature and the low-temperature preset threshold value with the second preset deviation threshold value; comparing the ambient temperature and a lower operating temperature limit of the vehicle thermal management system; when the ambient temperature is smaller than the lower operating temperature limit of the vehicle thermal management system, comparing the degree of deviation between the cell temperature and a low-temperature preset threshold value with a second preset deviation threshold value, and when the ambient temperature is not smaller than the lower operating temperature limit of the vehicle thermal management system, comparing the degree of deviation between the cell temperature and the low-temperature preset threshold value with the second preset deviation threshold value; comparing the degree of deviation between the cell temperature and a low-temperature preset threshold value with a second preset deviation threshold value; when the degree of deviation between the cell temperature and the low-temperature preset threshold value is greater than the second preset deviation threshold value, entering the third cell heating mode; when the degree of deviation between the cell temperature and the low-temperature preset threshold value is not greater than the second preset deviation threshold value, successively entering the cell temperature equalization mode, the second cell heating mode and the third cell heating mode; or successively entering the cell temperature equalization mode, the third cell heating mode and the first cell heating mode; comparing the degree of deviation between the cell temperature and the low-temperature preset threshold value with the second preset deviation threshold value; when the degree of deviation between the cell temperature and the low-temperature preset threshold value is greater than the second preset deviation threshold value, successively entering the cell temperature equalization mode and the first cell heating mode; or successively entering the cell temperature equalization mode and the first cell heating mode; comparing the degree of deviation between the cell temperature and the low-temperature preset threshold value with the second preset deviation threshold value; and when the degree of deviation between the cell temperature and the low-temperature preset threshold value is greater than the second preset deviation threshold value, entering the cell temperature equalization mode.

In addition, although not shown in the figures, a vehicle is provided herein which comprises the vehicle thermal management system in any of the foregoing embodiments or a combination thereof.

The above examples mainly illustrate a vehicle thermal management system, a vehicle thermal management method and a vehicle. Although only some implementations of the application are described, a person of ordinary skill in the art should understand that the application may be implemented in many other forms without departing from the essence and scope of the application. Therefore, the presented examples and implementations are deemed as illustrative rather than restrictive, and without departing from the spirit and scope of the application defined by the appended claims, the application may cover various modifications and substitutions.

The invention claimed is:

1. A vehicle thermal management system, comprising:
a flow path switching valve;
a compressor, an intake port and an exhaust port of the compressor being respectively connected to the flow path switching valve;
an in-cabin thermal management flow path, which comprises a fluid communication in-cabin heat exchanger, a first fan associated to the in-cabin heat exchanger, and a first throttle element connected to the in-cabin heat exchanger; a first end of the in-cabin thermal management flow path being connected to the flow path switching valve;
an out-cabin thermal management flow path, which comprises an out-cabin heat exchanger, a second fan associated to the out-cabin heat exchanger, and a second throttle element connected to the out-cabin heat exchanger; a first end of the out-cabin thermal management flow path is connected to the flow path switching valve; and a second end of the out-cabin thermal management flow path is connected to a second end of the in-cabin thermal management flow path; and
at least one battery module thermal management flow path, which comprises a cell heat exchanger associated to at least one cell of a battery module, and a third throttle element connected to the cell heat exchanger; a first end of the battery module thermal management flow path is connected to the flow path switching valve; and a second end of the battery module thermal management flow path is connected to the second end of the in-cabin thermal management flow path, the second end of the out-cabin thermal management flow path, and the flow path switching valve, respectively;
wherein the flow path switching valve is used for switching the on and off and flow direction of the intake port of the compressor, the exhaust port of the compressor, the in-cabin thermal management flow path, the out-cabin thermal management flow path, and the battery module thermal management flow path.

2. The vehicle thermal management system according to claim 1, wherein the in-cabin thermal management flow path is further provided with a first solenoid valve, which connects or disconnects the in-cabin thermal management flow path in a controlled way.

3. The vehicle thermal management system according to claim 2, wherein the in-cabin thermal management flow path further comprises a second solenoid valve in series connected to the first throttle element, and a first check valve in parallel connected with the first throttle element and the second solenoid valve; and the first check valve connects the first end to the second end of the in-cabin thermal management flow path.

4. The vehicle thermal management system according to claim 1, wherein the in-cabin thermal management flow path is further provided with a first temperature sensor and a second temperature sensor located at two ends of the in-cabin heat exchanger; and the vehicle thermal management system controls the opening degree of the first throttle element and/or the rotational speed of the first fan based on the first temperature sensor and/or the second temperature sensor.

5. The vehicle thermal management system according to claim 1, wherein the out-cabin thermal management flow path further comprises a second check valve in series connected to the second throttle element, and a first unidirectional drier in parallel connected with the second throttle element and the second check valve; and the first unidirectional drier is connected from the first end to the second end of the out-cabin thermal management flow path, and the second check valve is connected from the second end to the first end of the out-cabin thermal management flow path.

6. The vehicle thermal management system according to claim 5, wherein the out-cabin thermal management flow path further comprises: a third check valve and a second unidirectional drier which are arranged in parallel and close to the second end of the out-cabin thermal management flow path; and the third check valve is connected from the first end to the second end of the out-cabin thermal management flow path, and the second unidirectional drier is connected from the second end to the first end of the out-cabin thermal management flow path.

7. The vehicle thermal management system according to claim 1, further comprising a bypass branch which connects a liquid outlet of the out-cabin heat exchanger and the intake port of the compressor; and a third solenoid valve being provided thereon, which connects or disconnects the bypass branch in a controlled way.

8. The vehicle thermal management system according to claim 1, wherein the out-cabin thermal management flow path is further provided with a third temperature sensor and a fourth temperature sensor located at two ends of the out-cabin heat exchanger; and the vehicle thermal management system controls the opening degree of the second throttle element and/or the rotational speed of the second fan based on the third temperature sensor and/or the fourth temperature sensor.

9. The vehicle thermal management system according to claim 1, wherein the battery module thermal management flow path is further provided with a fourth solenoid valve, which connects or disconnects the battery module thermal management flow path in a controlled way.

10. The vehicle thermal management system according to claim 1, wherein the second end of the battery module thermal management flow path is provided with a first branch which is connected to the second end of the in-cabin thermal management flow path and the out-cabin thermal management flow path; and a second branch connected to the flow path switching valve; wherein the first branch further comprises a fourth check valve in series connection to the third throttle element, a fifth check valve in parallel connection with the third throttle element and the fourth check valve, and a fifth solenoid valve which connects or disconnects the first branch in a controlled way; and the second branch further comprises a sixth solenoid valve which connects or disconnects the second branch in a controlled way.

11. The vehicle thermal management system according to claim 1, wherein the battery module thermal management flow path is further provided with a fifth temperature sensor and a sixth temperature sensor located at two ends of the cell heat exchanger; and the vehicle thermal management system controls the opening degree of the third throttle element based on the fifth temperature sensor and/or the sixth temperature sensor.

12. A vehicle thermal management method for the vehicle thermal management system according to claim 1, the method comprising:
  a cell temperature equalization mode, in which the flow rate of the refrigerant flowing through each cell heat exchanger is adjusted by adjusting the opening degree of the third throttle element; and/or
  a cell cooling mode, in which the flow path switching valve is adjusted such that the refrigerant successively flows through the exhaust port of the compressor, the flow path switching valve, the out-cabin thermal management flow path, the battery module thermal management flow path, the flow path switching valve, and the intake port of the compressor; and/or
  a first cell heating mode, in which the flow path switching valve is adjusted such that the refrigerant successively flows through the exhaust port of the compressor, the flow path switching valve, the battery module thermal management flow path, the out-cabin thermal management flow path, the flow path switching valve, and the intake port of the compressor; and/or
  a second cell heating mode, in which the flow path switching valve is adjusted such that the refrigerant successively flows through the exhaust port of the compressor, the flow path switching valve, the battery module thermal management flow path, the flow path switching valve, and the intake port of the compressor.

13. The vehicle thermal management method according to claim 12, wherein the cell temperature equalization mode comprises: controlling, on the basis of the degree of deviation between a cell temperature and a high-temperature preset threshold value, the operating frequency of the compressor and/or the opening degree of the third throttle element; and/or controlling, on the basis of the degree of deviation between the cell temperature and a low-temperature preset threshold value, the opening and closing of a heating element.

14. The vehicle thermal management method according to claim 12, wherein the cell cooling mode comprises: starting or ending the cell cooling mode based on a cell temperature; and/or controlling, on the basis of the temperature sensor arranged downstream of the out-cabin heat exchanger, the rotational speed of the second fan; and/or controlling, on the basis of the temperature sensor arranged downstream of the cell heat exchanger, the opening degree of the third throttle element.

15. The vehicle thermal management method according to claim 12, wherein the first cell heating mode comprises: starting or ending the first cell heating mode based on a cell temperature; and/or controlling, on the basis of the temperature sensor arranged downstream of the out-cabin heat exchanger, the rotational speed of the second fan and/or the opening degree of the second throttle element; and/or controlling, on the basis of the temperature sensor arranged downstream of the cell heat exchanger, the operating frequency of the compressor.

16. The vehicle thermal management method according to claim 15, further comprising a bypass branch which connects a liquid outlet of the out-cabin heat exchanger and the intake port of the compressor; a third solenoid valve being provided thereon; wherein the first cell heating mode comprises: controlling, on the basis of the temperature sensor arranged downstream of the out-cabin heat exchanger, the on/off of the third solenoid valve.

17. The vehicle thermal management method according to claim 12, wherein the second cell heating mode comprises: ending the second cell heating mode based on the operating time of the second cell heating mode; and/or controlling, on the basis of the temperature sensor arranged downstream of the cell heat exchanger, the operating frequency of the compressor.

18. The vehicle thermal management method according to claim 12, further comprising:
  comparing a cell temperature with a high-temperature preset threshold value; when the cell temperature is greater than the high-temperature preset threshold value, entering the cell cooling mode, and when the cell temperature is not greater than the high-temperature preset threshold value, comparing the cell temperature with a low-temperature preset threshold value;
  entering the cell cooling mode;
  comparing the degree of deviation between the cell temperature and the high-temperature preset threshold value with a first preset deviation threshold value; when the degree of deviation between the cell temperature and the high-temperature preset threshold value is greater than the first preset deviation threshold value, entering the cell temperature equalization mode; when the degree of deviation between the cell temperature and the high-temperature preset threshold value is not greater than the first preset deviation threshold value, comparing a cell temperature with a high-temperature preset threshold value;
  comparing the cell temperature with a low-temperature preset threshold value; when the cell temperature is greater than the low-temperature preset threshold value, comparing the ambient temperature and a lower operating temperature limit of the vehicle thermal management system, and when the cell temperature is not greater than the low-temperature preset threshold value, comparing the degree of deviation between the cell temperature and the low-temperature preset threshold value with the second preset deviation threshold value;
  comparing the ambient temperature and a lower operating temperature limit of the vehicle thermal management system; when the ambient temperature is smaller than the lower operating temperature limit of the vehicle thermal management system, comparing the degree of deviation between the cell temperature and a low-temperature preset threshold value with a second preset deviation threshold value, and when the ambient temperature is not smaller than the lower operating temperature limit of the vehicle thermal management system, comparing the degree of deviation between the cell temperature and the low-temperature preset threshold value with the second preset deviation threshold value;

comparing the degree of deviation between the cell temperature and a low-temperature preset threshold value with a second preset deviation threshold value; when the degree of deviation between the cell temperature and the low-temperature preset threshold value is greater than the second preset deviation threshold value, entering the third cell heating mode; when the degree of deviation between the cell temperature and the low-temperature preset threshold value is not greater than the second preset deviation threshold value, successively entering the cell temperature equalization mode, the second cell heating mode and the third cell heating mode; or successively entering the cell temperature equalization mode, the third cell heating mode and the first cell heating mode;

comparing the degree of deviation between the cell temperature and the low-temperature preset threshold value with the second preset deviation threshold value; when the degree of deviation between the cell temperature and the low-temperature preset threshold value is greater than the second preset deviation threshold value, successively entering the cell temperature equalization mode and the first cell heating mode; or successively entering the cell temperature equalization mode and the first cell heating mode;

comparing the degree of deviation between the cell temperature and the low-temperature preset threshold value with the second preset deviation threshold value; and when the degree of deviation between the cell temperature and the low-temperature preset threshold value is greater than the second preset deviation threshold value, entering the cell temperature equalization mode.

* * * * *